United States Patent
Carrabin et al.

(10) Patent No.: US 12,546,847 B2
(45) Date of Patent: Feb. 10, 2026

(54) SYSTEM AND METHOD FOR POSITIONING AT LEAST ONE MOBILE RECEIVER

(71) Applicant: WHEERE, Montpellier (FR)

(72) Inventors: Antoine Carrabin, Paris (FR); Pierre-Arnaud Coquelin, Riviére sur tarn (FR); Stéphane David-Grignot, Prades-le-Lez (FR)

(73) Assignee: WHEERE, Montpellier (FR)

( * ) Notice: Subject to any disclaimer, the term of this patent is extended or adjusted under 35 U.S.C. 154(b) by 306 days.

(21) Appl. No.: 18/555,116

(22) PCT Filed: Apr. 13, 2022

(86) PCT No.: PCT/FR2022/050695
§ 371 (c)(1),
(2) Date: Oct. 12, 2023

(87) PCT Pub. No.: WO2022/219286
PCT Pub. Date: Oct. 20, 2022

(65) Prior Publication Data
US 2024/0125883 A1    Apr. 18, 2024

(30) Foreign Application Priority Data

Apr. 13, 2021    (FR) ...................................... 2103806

(51) Int. Cl.
*G01S 5/02*        (2010.01)
*G01S 5/10*        (2006.01)

(52) U.S. Cl.
CPC .......... *G01S 5/0226* (2013.01); *G01S 5/0273* (2013.01); *G01S 5/10* (2013.01)

(58) Field of Classification Search
CPC ......... G01S 5/0226; G01S 5/0273; G01S 5/10
(Continued)

(56) References Cited

U.S. PATENT DOCUMENTS

2015/0201309 A1    7/2015  Liu
2020/0209337 A1 *  7/2020  Dabak ....................... G01S 3/16

FOREIGN PATENT DOCUMENTS

CN    103983974 A  *  8/2014  ............... G01S 7/32
CN    116125458 A  *  5/2023  ........... G01S 13/343
(Continued)

OTHER PUBLICATIONS

International Search Report and Written Opinion for International Application No. PCT/FR2022/050695, dated Aug. 11, 2022.

*Primary Examiner* — Harry K Liu
(74) *Attorney, Agent, or Firm* — LEASON ELLIS LLP

(57) ABSTRACT

The invention relates to a system (1) for positioning at least one mobile receiver (2), comprising at least two stationary transmitter bases (4, 4A, 4B). Each transmitter base (4, 4A, 4B) is configured to transmit radio frequency signals ($S1_A$, $S1_B$, $s_{dA}$, $s_{dB}$, $s_{rA}$, $s_{rB}$) and to transmit a sum ($S1_A$, $S1_B$) of at least two unmodulated pure carrier signals of different frequencies; and the mobile receiver (2) further comprises: means for measuring phases of the signals; and computing means configured to: apply a Fourier transform to a signal consisting of the various measured phases of the radio frequency signals; determine a time-of-flight between the mobile receiver (2) and each base (4A, 4B); calculate at least one time-of-flight difference between the mobile (2) and two transmitter bases (4A, 4B); determine the position of the mobile receiver (2) from the calculated time-of-flight difference(s).

13 Claims, 2 Drawing Sheets

(58) Field of Classification Search
USPC .......................................................... 342/464
See application file for complete search history.

(56) References Cited

FOREIGN PATENT DOCUMENTS

| | | | | |
|---|---|---|---|---|
| DE | 102020008040 A1 | * | 11/2021 | ........... G01S 13/343 |
| WO | WO-2024123435 A1 | * | 6/2024 | ........... H04L 5/0007 |

* cited by examiner

[Fig. 1]
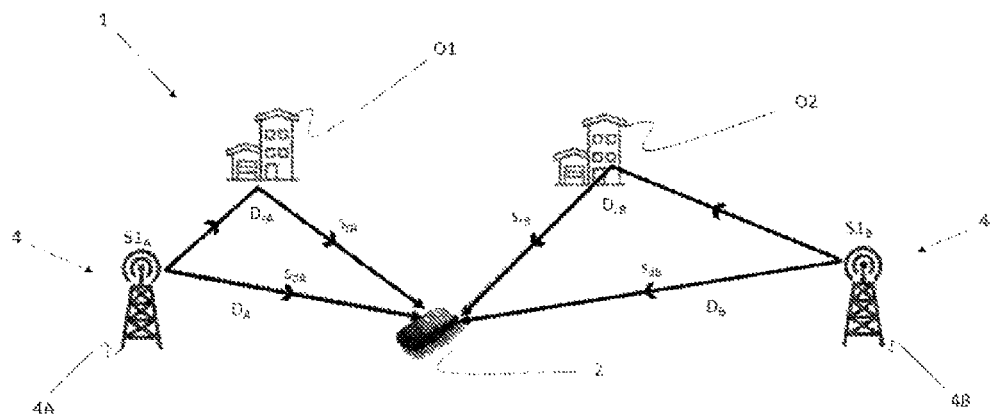
[Fig. 2]
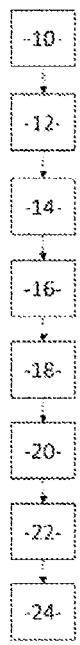

[Fig. 3]
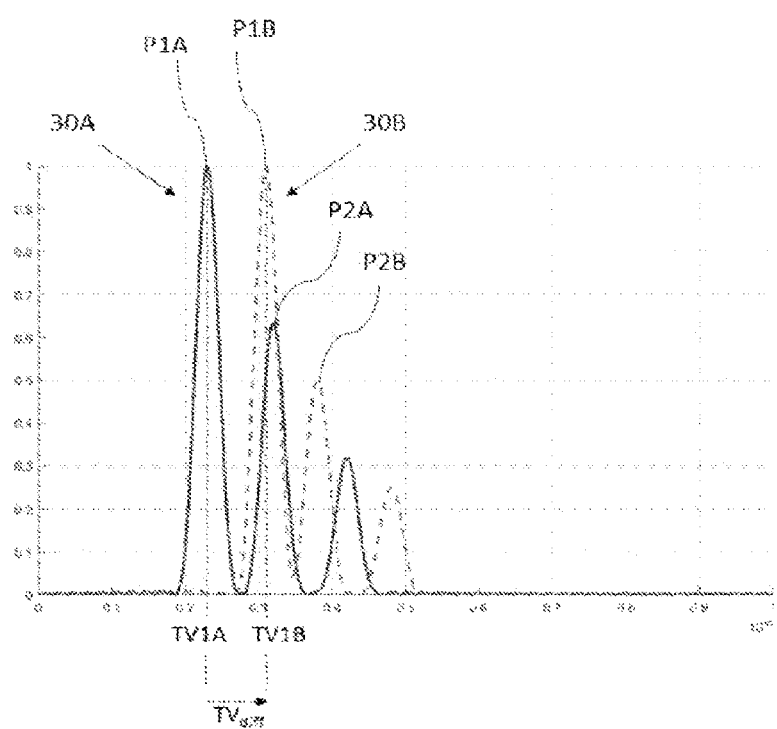

SYSTEM AND METHOD FOR POSITIONING AT LEAST ONE MOBILE RECEIVER

CROSS-REFERENCE TO RELATED PATENT APPLICATIONS

This application is a U.S. National Stage Application under 35 U.S.C. § 371 of International Patent Application No. PCT/FR2022/050695 filed Apr. 13, 2022, and French Patent Application No. 2103806 filed Apr. 13, 2021, both of which are incorporated by reference in their entireties. The International Application was published on Oct. 20, 2022, as International Publication No. WO/2022/219286 A1.

TECHNICAL FIELD

The invention relates to a system and a method for positioning at least one mobile receiver. The technical field of the invention is that of positioning a mobile receiver, by the mobile itself, in an outdoor or indoor environment. The system comprises, in addition to the mobile receiver, stationary transmitter bases or antennas which are configured to transmit radio frequency signals intended for the mobile receiver. The calculation of the transmission time, or time-of-flight, by the mobile receiver during the transmission of these signals, allows it to determine how far its distance is from each base, and therefore to deduce therefrom its position.

PRIOR ART

The location of receivers in an external environment experienced a significant technological jump with the deployment of the GPS (Global Positioning System) System in the 1980s. However, GPS technology does not work in an indoor environment, typically inside buildings, and relatively poorly in urban environments. The two main constraints of indoor or urban environments are:
  penetration of the buildings and various obstacles by the signals of interest (which constitutes a limiting factor for the range of the positioning system); and
  the existence of multi-paths impacting the transmitted wave, which results in numerous time-delayed replicas of the original signal of variable amplitude arriving at the mobile receiver, such multi-path signals being called bounces.

There is therefore a need for mobile receiver positioning systems that have both a large range (typically greater than 10 km) and which operate in both an indoor and outdoor environment.

In a known manner, a location system in an outdoor or indoor environment usually comprises, in addition to the mobile to be positioned, a set of at least three beacons. These beacons are distinguished in that their position is known. Furthermore, they are most often stationary. In such a system configuration, the beacons control the transmissions: a beacon transmits to a mobile, the mobile responds by retransmitting to the beacon. The measurement of the transmission time, by differential measurement of the transmission date relative to the reception date, makes it possible to determine the distance between the beacon and the mobile. However, such a system requires a retransmission of signals from the mobile receiver to the beacons, so that a remote server deduces therefrom the position of the mobile, and therefore does not allow the mobile to perform its own positioning.

Also in a known manner, radiolocating systems use modulated radio frequency signals, transmitted by stationary beacons or antennas, to transmit, for example, positioning data or random data to a receiver. Such random data, for example known to the receiver in advance, serve to assist it in synchronizing to the random data by performing signal correlations. However, such systems involve the use of a wide frequency transmission bandwidth, typically a bandwidth of several tens or hundreds of MHz for positioning systems with metric or sub-metric precision. Such an operation is particularly expensive. In addition, such radiolocating systems do not allow dual operation, both in outdoor and indoor environments.

Also known from the state of the art are systems for positioning an object, implementing a method by phase interferometry, which uses the amplitude and phase. US patent document 2020/0209337 A1 describes such a positioning system. The system comprises at least two stationary transmitter bases which transmit radio frequency signals. The system also comprises a mobile receiver, able to determine the position of one of the stationary transmitter bases. To do this, the mobile receiver becomes a master device which transmits a signal comprising a sinusoidal portion. The transmitter base whose position is to be determined becomes a slave device which measures the phase and amplitude of the signal upon reception. It returns this information to the master device as well as a similar sinusoidal portion to allow the master device to detect the phase and amplitude of the received signal. The master device then applies a discrete Fourier transform to the measured signals, in the time domain, in order to determine the distance and thus the position of the slave device. Such a determination is carried out by measuring the time-of-flight. However, such a positioning system does not allow the mobile receiver to quickly and easily determine its own positioning. Indeed, the mobile receiver is obliged in this case to successively determine the position of at least three stationary transmitter bases, then to cross-reference these measurements to deduce therefrom its position. Such a determination is lengthy, tedious and therefore expensive. In addition, in order to avoid disturbing the measurements due to the presence of multi-paths, the system described in this document implements super-resolution algorithms. However, the implementation of such a system leads to a relatively significant noise band, which is detrimental to the sensitivity of the system. Indeed, the transmission of information caused by this system (transmission of modulated signals) involves having a relatively broad channel width, and therefore that the receiver is obliged to take into account the entire channel in order to retrieve the information. The accuracy of the location can thus be affected.

SUMMARY OF THE INVENTION

An object of the present invention is that of at least partly overcoming the above-mentioned disadvantages.

In particular, one objective of the present invention is to provide a system for positioning at least one mobile receiver having both a large range (typically greater than 10 km) and operating both in an indoor environment and an outdoor environment, allowing the mobile itself to accurately find its position, and making it possible to limit spectrum occupancy while exhibiting an increased sensitivity and a minimal equivalent noise band.

Another objective of the present invention is to provide a system for positioning at least one mobile receiver enabling the mobile itself to accurately find its position, by distinguishing the direct line-of-sight signals coming from an transmitter base, from the various signal bounces (multi-paths).

To this end, the invention relates to a system for positioning at least one mobile receiver, the system comprising, in addition to the mobile, at least two stationary transmitter bases, each transmitter base being configured to transmit radio frequency signals, the transmitter bases being synchronized with each other to transmit their respective signals, the mobile receiver being configured to receive and process said radio frequency signals and to deduce therefrom its position by calculating the time-of-flight difference between the mobile receiver and the transmitter bases, the mobile receiver comprising means for storing position data of the stationary transmitter bases, wherein each transmitter base is configured to transmit a sum of at least two unmodulated pure carrier signals of different frequencies, each pure carrier signal being in the form of an unmodulated continuous wave, preferably sinusoidal; and the mobile receiver further comprises:

means for measuring, for each given signal frequency and for each respective transmitter base, the phase of the signal consisting of the various signals coming from said base and having said frequency; and computing means connected to the measuring means and to the storage means, and configured to:

apply, for each transmitter base, a Fourier transform to a signal consisting of the various measured phases of the radio frequency signals coming from said base;

determine, for each transmitter base, from the Fourier transform computed for said base, a time-of-flight between the mobile receiver and said base;

calculate at least one time-of-flight difference between the mobile and two transmitter bases, said difference being calculated as the difference between the determined times-of-flight for said bases;

determine the position of the mobile receiver, from the calculated time-of-flight difference(s) and position data of the transmitter bases.

The use by the system of pure carrier signals in the form of unmodulated continuous waves makes it possible to limit the spectrum occupancy, and therefore to ensure very good sensitivity of the system by reducing the equivalent noise band as much as possible. Such signals indeed have a minimal spectrum occupancy. This makes it possible to obtain a system for positioning a mobile receiver having a large range as well as a low operating cost, operating both in indoor and outdoor environments, and allowing the mobile itself to accurately find its position. Such an approach by transmitting sums of unmodulated pure carrier signals is not used in the positioning and radiolocating systems of the prior art, in particular due to multi-paths (bounces of the transmitted signal that arrive at the mobile receiver with a time delay) which are difficult to dissociate from the original line-of-sight signal, when such a signal is an unmodulated continuous wave. The use by the system according to the invention of a Fourier transform applied to a signal consisting of the various measured phases of the radio frequency signals allows the mobile receiver to distinguish the bounces from the main signal, and thus to measure the times-of-flight (between the mobile and the bases) unaffected by errors due to the multi-path. Unlike certain positioning systems of the prior art, which apply a Fourier transform to a time signal, the positioning system according to the invention applies a Fourier transform to a signal consisting of signal phases of different frequencies. Such an approach allows the mobile receiver to be able to distinguish the bounces from the main signal, the latter being the first to arrive at the mobile receiver (the bounces arriving thereafter). Furthermore, the transmitter bases of the positioning system according to the invention do not transmit any modulated data, unlike many systems of the prior art. This reduces the spectrum occupancy and therefore the cost and complexity of the system.

Advantageously, for each transmitter base, the frequency difference between the minimum frequency and the maximum frequency of the pure carrier signals transmitted by said base is greater than 50 MHz. This makes it possible to reduce the resolution of the Fourier transform, and therefore to obtain an improved location accuracy, typically less than 1 m. The resolution of the Fourier transform thus reduced then makes it possible to improve the separation or distinguishing between the direct line-of-sight signal coming from a transmitter base on the one hand, and the various rebounds of the signal (multi-paths) on the other hand. Indeed, such separation or distinguishing is possible provided that the resolution of the Fourier transform is sufficiently fine, more specifically provided that it is less than the time interval separating the main signal (in direct line-of-sight) from the bounce in question. The positioning system according to the invention makes it possible to obtain a location accuracy for the mobile receiver of less than 1 m, even inside buildings or in an urban environment, and does so without resorting to GPS or GNSS (Global Navigation Satellite System) signals.

According to a preferred embodiment, each pure carrier signal transmitted by a transmitter base has a frequency located in the band of very high frequencies, in other words has a frequency in the range from 30 MHz to 300 MHz. This makes it possible to obtain the best compromise between signal penetrability inside buildings, limitation of multi-path phenomena, and dimensions of the transmission and reception antennas. Furthermore, the use of such signals greatly limits the bandwidth used. The very high frequency band also offers a broad choice as to the use of pure sinusoidal signals.

Preferably, the stationary transmitter bases are configured to transmit the same number of unmodulated pure carrier signals.

Advantageously, the stationary transmitter bases are configured so as to transmit their sums of unmodulated pure carrier signals in a frequency-shifted manner, with a predetermined frequency shift between two successive transmitter bases. This allows the mobile receiver to be able to distinguish the sums of unmodulated pure carrier signals coming from each of the transmitter bases.

Preferably, the frequency shift is in the range from 100 Hz to 1 kHz. Such a frequency shift value allows the sums of unmodulated pure carrier signals to be easily separated by the mobile receiver, while remaining in the same frequency channel (of frequency width equal to 12.5 kHz, in the very high frequency band). This limits the number of frequency channels occupied, and consequently reduces the cost of implementing the system.

According to a particular technical feature of the invention, the stationary transmitter bases are antennas, preferably antennas distributed such that the distance between two adjacent antennas is greater than or equal to 5 km.

According to another particular technical feature of the invention, the mobile receiver is a chip or an electronic card or else a mobile communication device such as a cell phone.

Preferably, each stationary transmitter base is configured to synchronize among themselves the unmodulated pure carrier signals transmitted by the base.

According to a particular technical feature of the invention, each stationary transmitter base is configured to transmit a sum S1 of N distinct unmodulated sinusoidal frequency signals $\omega_k$, said sum S1 satisfying the following equation:

$$S1 = \sum_{k=1}^{N} \cos(\omega_k t) \quad \text{[Math 1]}$$

The invention also relates to a method for positioning at least one mobile receiver, implemented by a positioning system comprising, in addition to the mobile, at least two stationary transmitter bases, each transmitter base being configured to transmit radio frequency signals, the transmitter bases being synchronized with each other to transmit their respective signals, the mobile receiver comprising means for measuring signal phases, data storage means, and computing means connected to the measuring means and to the storage means, the method comprising an initial step of transmitting position data from the stationary transmitter bases to the storage means of the mobile receiver, wherein the method further comprises the following steps:

- an emission, by each of the transmitter bases, of a sum of at least two unmodulated pure carrier signals of different frequencies, each pure carrier signal being in the form of an unmodulated continuous wave, preferably sinusoidal;
- a reception, by the mobile receiver, of the radio frequency signals coming from the transmitter base;
- a measurement, by the mobile receiver, for each given signal frequency and for each respective transmitter base, of the phase of the signal consisting of the various signals coming from said base and having said frequency;
- an application, by the mobile receiver and for each transmitter base, of a Fourier transform to a signal consisting of the different measured phases of the radio frequency signals received from said base; a determination, by the mobile receiver and for each transmitter base, from the
- Fourier transform computed for said base, a time-of-flight between the mobile receiver and said base;
- a calculation, by the mobile receiver, of at least one time-of-flight difference between the mobile and two transmitter bases, said difference being calculated as the difference between the determined times-of-flight for said bases;
- a determination, by the mobile receiver, of its position from the calculated time-of-flight difference(s) and from the position data of the transmitter bases.

According to a particular technical feature of the invention, during the step of applying a Fourier transform, the Fourier transform is a discrete Fourier transform.

Advantageously, during the step of applying a Fourier transform, the computing means of the mobile receiver use the time-of-flight as an independent variable for the applied Fourier transform.

BRIEF DESCRIPTION OF THE FIGURES

The invention will be better understood on reading the following description, given solely by way of example, and with reference to the appended Figures wherein:

FIG. 1 shows a diagram of a positioning system of a mobile receiver according to the invention, FIG. 2 shows a flowchart representing a method for positioning a mobile receiver according to the invention, implemented by the system of FIG. 1, and FIG. 3 shows a graph representing two Fourier transforms as a function of the time-of-flight, each Fourier transform corresponding to a distinct transmitter base and having been applied by the mobile receiver to a signal consisting of the various measured phases of the radio frequency signals coming from that base.

DESCRIPTION OF THE EMBODIMENTS

In the following, a system 1 for positioning a mobile receiver 2 is disclosed. The system 1 comprises, in addition to the mobile receiver 2, at least two stationary transmitter bases 4. In the particular embodiment of FIG. 1, wherein such a positioning system 1 is shown, the system 1 comprises two stationary transmitter bases 4A, 4B. However, the invention applies in the same way to any positioning system comprising a number of transmitter bases greater than or equal to two, and preferably greater than or equal to three. Providing at least three transmitter bases in the positioning system ensures better robustness for the system.

The mobile receiver 2 is configured to receive and process radio frequency signals $s_{dA}$, $s_{dB}$, $s_{rA}$, $s_{rB}$ coming from the stationary transmitter bases 4A, 4B, and to deduce therefrom its position by calculating the time-of-flight difference between the mobile receiver 2 and the transmitter bases 4A, 4B (as will be described below). This differential time-of-flight calculation avoids any time synchronization constraint between the mobile receiver 2 and the transmitter bases 4A, 4B.

The mobile receiver 2 comprises storage means (not shown), configured to store position data of the stationary transmitter bases 4A, 4B. The storage means typically consist of a memory, typically a non-volatile memory. The mobile receiver 2 further comprises means for measuring phases of radio frequency signals, these measuring means not being shown in the figures for the sake of clarity. The mobile receiver 2 also comprises computing means (not shown) connected to the measuring means and to the storage means. The means for measuring and computing typically consist of a processing unit, for example formed of one or more processors, or integrated within an electronic chip. By way of non-limiting examples, the mobile receiver 2 is typically composed of a chip or an electronic card, for example integrated into a portable device; or a mobile communication device such as a cell phone. In the case where the mobile receiver 2 consists of an electronic chip or a mobile telephone type mobile communication device, the latter is typically provided with an analog-to-digital converter.

Each transmitter base 4A, 4B is typically an antenna for transmitting radio frequency signals $S1_A$, $S1_B$, $s_{dA}$, $s_{dB}$, $s_{rA}$, $s_{rB}$. Preferably, when the transmitter bases 4A, 4B are antennas, they are distributed such that the distance between two adjacent antennas is greater than or equal to 5 km. The transmitter bases 4A, 4B of the positioning system 1 are synchronized to each other to transmit their respective signals. "Synchronized between them" is understood to mean that the phase shift between the signals transmitted by the different transmitter bases 4A, 4B is constant, so as to avoid drift in the signals, and thus to avoid falsifying the measurement carried out by the mobile receiver 2 for its positioning.

Each transmitter base 4A, 4B is configured to transmit a sum $S1_A$, $S1_B$ of at least two unmodulated pure carrier signals of different frequencies. Each pure carrier signal is in the form of an unmodulated continuous wave, preferably sinusoidal. According to a preferred embodiment, each unmodulated pure carrier signal is a pure sinusoidal signal, and each stationary transmitter base 4A, 4B is configured to transmit a sum $S1_A$, $S1_B$ of N distinct unmodulated sinusoidal frequency signals $\omega_k$. Each sum $S1_A$, $S1_B$ of signals satisfies the following general equation form:

$$S1_{A,B} = \sum_{k=1}^{N} \cos(\omega_k t) \quad \text{[Math 2]}$$

Preferably, the frequency difference between the minimum frequency and the maximum frequency among the frequencies $\omega_k$ of the pure carrier signals transmitted by each transmitter base 4A, 4B is greater than 50 MHz. More preferably, each pure carrier signal transmitted by a transmitter base 4A, 4B has a frequency located in the band of very high frequencies, in other words has a frequency in the range from 30 MHz to 300 MHz. Frequency bands belonging to the very high frequency VHF range are thus assigned to the stationary transmitter bases 4A, 4B of the positioning system 1.

Preferably, the stationary transmitter bases 4 are configured to transmit the same number N of unmodulated pure carrier signals. According to a preferential embodiment, the transmitter bases 4 are configured so as to transmit their sums S1 of unmodulated pure carrier signals in a frequency-shifted manner, with a predetermined frequency shift $\Delta\omega$ between two successive transmitter bases 4. Thus, in the embodiment shown in FIG. 1, a first transmitter base 4A, respectively a second transmitter base 4B, is configured to transmit a sum $S1_A$, respectively $S1_B$, of unmodulated sinusoidal signals satisfying the following equation:

$$S1_A = \sum_{k=1}^{N} \cos(\omega_k t) \quad \text{[Math 3]}$$

$$S1_B = \sum_{k=1}^{N} \cos((\omega_k + \Delta\omega)t) \quad \text{[Math 4]}$$

The sums $S1_A$ and $S1_B$ of sinusoidal signals are thus frequency-shifted, a frequency shift $\Delta\omega$ (expressed for example in rad/s). The frequency shift $\Delta\omega$ is preferentially in the range from 100 Hz to 1 kHz. Each transmitter base 4A, 4B is advantageously configured to synchronize among themselves the sinusoidal signals that it transmits.

With reference to FIG. 1, it is assumed in the remainder of the description that the environment wherein the mobile receiver 2 is moving comprises a first obstacle O1 and a second obstacle O2. The two obstacles O1 and O2 are in this case buildings, but could, alternatively, be formed of any other type of structure without affecting the reasoning that follows. For each transmitter base 4A, 4B, the radio frequency signals received by the mobile receiver 2 and coming from this base 4A, 4B are divided into two types: a first type consists of the signals $s_{dA}$, $s_{dB}$ arriving in direct line of sight, and a second type consists of the signals $s_{rA}$, $s_{rB}$ arriving at the mobile receiver 2 after bouncing off an obstacle O1, O2. The signals $s_{dA}$, $s_{rA}$, respectively $s_{dB}$, $s_{rB}$, each correspond to the sum $S1_A$, respectively $S1_B$, of unmodulated pure carrier signals, but follow different paths. $D_A$, respectively $D_B$, refers to the line-of-sight distance between the mobile receiver 2 and the first transmitter base 4A, respectively the second transmitter base 4B, traveled by the signals $s_{dA}$, respectively $s_{dB}$. $D_{rA}$, respectively $D_{rB}$, refers to the distance traveled by the signals $s_{rA}$, respectively $s_{rB}$ after bouncing off an obstacle O1, respectively O2. For the sake of simplification, for the first transmitter base 4A, only the radio frequency signals coming from that base and having bounced off the obstacle O1 closest to that base 4A (the impact of the signals coming from this base and having bounced off the other obstacle O2 are considered to be negligible) are hereafter taken into account. Likewise, for the second transmitter base 4B, only the radio frequency signals coming from that base and having bounced off the obstacle O2 closest to that base 4B (the impact of the signals coming from that base and having bounced off the other obstacle O1 are considered to be negligible) are taken into account. It is also assumed for simplicity's sake that the radio frequency signals only bounce once off one of the obstacles O1, O2.

The method for positioning the mobile receiver 2, implemented by the positioning system 1, will now be described in detail, with reference in particular to FIG. 2.

The method comprises an initial step 10 of transmitting position data from the stationary transmitter bases 4A, 4B to the storage means of the mobile receiver 2. The transmission 10 may for example consist of each transmitter base 4A, 4B transmitting its position coordinates to the mobile receiver 2, or of the position coordinates of the bases being previously implanted within the mobile receiver 2, at the time of its manufacture or its configuration. At the end of this initial step 10, the storage means of the mobile receiver 2 store the position data of the transmitter bases 4A, 4B.

The method comprises a following step 12 during which each transmitter base 4A, 4B transmits the sum $S1_A$, $S1_B$ of distinct unmodulated pure carrier signals wk. The phase shift between the signals $S1_A$, $S1_B$ transmitted by the different transmitter bases 4A, 4B is constant. The sums $S1_A$ and $S1_B$ of pure carrier signals transmitted by the bases 4A, 4B are thus frequency-shifted, by a frequency shift $\Delta\omega$. The different frequencies $\omega_k$ used by the bases 4A, 4B, as well as the frequency shift $\Delta\omega$, are known by the mobile receiver 2 (pre-implanted in it or transmitted to it).

During a next step 14, the mobile receiver 2 receives the radio frequency signals $s_{dA}$, $s_{dB}$, $s_{rA}$, $s_{rB}$ coming from the transmitter bases 4A, 4B. These signals $s_{dA}$, $s_{rA}$, respectively $s_{dB}$, $s_{rB}$, each correspond to the sum $S1_A$, respectively $S1_B$, of unmodulated pure carrier signals, but follow different paths. Thanks to the fact that the sums $S1_A$, $S1_B$ of signals are frequency-shifted with a predetermined frequency shift (known to the mobile receiver 2), the mobile receiver 2 can distinguish the signals $s_{dA}$, $s_{rA}$ coming from the first base 4A on the one hand, from the signals $s_{dB}$, $s_{rB}$ coming from the second transmitter base 4B on the other hand.

During a next step 16, the mobile receiver 2 determines via its measuring means, for each given signal frequency $\omega_k$ and for each transmitter base 4A, 4B, the phase of the signal consisting of the various signals $s_{dA}$, $s_{rA}$; respectively $s_{dB}$, $s_{rB}$, coming from this base 4A, 4B and having the frequency $\omega_k$. Indeed, for example for the first base 4A and for a given frequency $\omega_k$, both signals $s_{dA}(\omega_k)$ and $s_{rA}(\omega_k)$ are received by the mobile receiver 2 by being mixed. The phase measured by the mobile receiver 2 for the frequency $\omega_k$ then corresponds to the phase of the signal consisting of the sum of the direct signal $s_{dA}$ and bounce signal $s_{rA}$. The same reasoning applies to the signals $s_{dB}$, $s_{rB}$ coming from the second base 4B. According to a particular embodiment, this phase measurement can consist in that the measuring means apply, for each frequency $\omega_k$, a multiplier coefficient $e^{i\omega k}$ to each signal consisting of the various signals $s_{dA}$, $s_{rA}$; respectively $s_{dB}$, $s_{rB}$, coming from the first base 4A, respectively from the second base 4B. This makes it possible to isolate the phase of each unmodulated pure carrier signal forming part of the signals $s_{dA}$, $s_{rA}$, respectively $s_{dB}$, $s_{rB}$.

During a next step 18, the mobile receiver 2 applies, via its computing means and for each of the transmitter bases 4A, 4B, a Fourier transform to a signal consisting of the different measured phases of the radio frequency signals received from this base. Indeed, the principle used by the invention is that, for a given time delay, the phase shift undergone by an unmodulated pure carrier signal depends on the frequency of this signal. The Fourier transform applied during step 18 is typically a discrete Fourier transform, and in particular a complex-coefficient discrete Fourier transform.

For each transmitter base 4A, 4B, the Fourier transform TF applied to the measured phases of the signals from this base is then mathematically expressed via the following function:

$$TF(d_n) = \sum_{k=1}^{N} r(\omega_k) \cdot e^{-i\omega_k \frac{d_n}{c}} \qquad \text{[Math 5]}$$

where $r(\omega_k)$ is the phase of the signals coming from the base and having the frequency $\omega_k$, as measured during the preceding step 16; and $$\frac{d_n}{c}$$

represents the time-of-flight of a signal coming from the transmitter base 4A, 4B in question and received by the mobile receiver 2. The complex coefficients of the Fourier transform TF are then:

$$e^{-i\omega_k \frac{d_n}{c}}.$$

The independent variable of the Fourier transform TF thus expressed is then the time-of-flight $$\frac{d_n}{c}.$$

In this way, by graphically representing, for each transmitter base 4A, 4B, the result of the Fourier transform applied during step 18, the computing means may during a next step 20 isolate different peaks corresponding to each signal $s_{dA}$, $s_{rA}$ or $s_{dB}$, $s_{rB}$ and deduce therefrom the time-of-flight of each of these signals. This is shown in the graph of FIG. 3, on which two graphic functions 30A, 30B have been shown. These two functions 30A, 30B correspond respectively to the calculation of the Fourier transform for the first transmitter base 4A, and for the second transmitter base 4B, shown as a function of the time-of-flight (which is therefore read on the x-axis). During this step 20, the computing means of the mobile receiver 2 determine the time-of-flight between the mobile receiver 2 and each of the bases 4A, 4B. To do this, the computing means isolate the peak P1A, P1B that has the shortest time-of-flight. This peak P1A, P1B corresponds to the signal $s_{dA}$, $s_{dB}$ in direct line of sight. In the embodiment shown, for the first base 4A, the peak P1A corresponding to the signal $s_{dA}$ has a time-of-flight TV1A substantially equal to 230 ns. The time-of-flight TV1A between the mobile receiver 2 and the first base 4A is therefore substantially 230 ns. For the second base 4B, the peak P1B corresponding to the signal $s_{dB}$ has a time-of-flight TV1B substantially equal to 310 ns. The time-of-flight TV1B between the mobile receiver 2 and the second base 4B is therefore substantially 310 ns. For each of the bases 4A, 4B, the second peak P2A, P2B, which has a lower amplitude than that of the first peak P2A, P2B and a longer time-of-flight, corresponds to the signal $s_{rA}$, $s_{rB}$ that has bounced off an obstacle O1, O2. This peak P2A, P2B can therefore advantageously be isolated from the first peak P1A, P1B, and not be taken into account in the rest of the calculations.

During a next step 22, the mobile receiver 2 calculates at least one difference in time-of-flight $TV_{diff}$ between the mobile 2 and two transmitter bases 4A, 4B. The difference in time-of-flight $TV_{diff}$ is calculated as the difference between the times-of-flight TV1A, TV1B determined for the transmitter bases 4A, 4B during step 20. In the embodiment shown in FIG. 3, the time difference of the times-of-flight $TV_{diff}$ is substantially equal to 80 ns (310 ns–230 ns). In the case where the positioning system comprises a number of transmitter bases greater than or equal to three, the mobile receiver 2 calculates several differences in times-of-flight, between the mobile and the transmitter bases taken in pairs, each time-of-flight difference being calculated between the mobile 2 and two distinct transmitter bases.

During a final step 24, the computing means of the mobile receiver 2 determine the position of the mobile receiver 2 from the calculated time-of-flight difference(s) $TV_{diff}$ and from the position data of the transmitter bases 4A, 4B, previously stored in the storage means. From the known position data of the transmitter bases 4A, 4B, the absolute position of the mobile receiver is easily given by the conventional relationship between the speed of the waves and the time-of-flight. In the case where the positioning system comprises a number of transmitter bases greater than or equal to three, the means for calculating the mobile receiver 2 cross-reference the various measurements of time-of-flight differences in order to determine the position of the mobile receiver 2.

Due to the fact that the order of magnitude of the time-of-flight differences(s) thus determined is about a nanosecond, it is understood on reading the foregoing that the system 1 according to the invention advantageously makes it possible to achieve a sub-metric accuracy (less than 1 m) for the positioning of the mobile 2, and does so even inside buildings or in an urban environment. In addition, the mobile receiver 2 finds its own position autonomously. Finally, the positioning system 1 has both a large range (typically greater than 10 km), functions in both an indoor and an outdoor environment, and has a limited spectrum occupancy, an increased sensitivity and a maximum equivalent noise band. All these features, obtained together in the same system, are novel and particularly advantageous compared to the various positioning systems of the prior art.

The invention claimed is:

1. A system for positioning at least one mobile receiver, the system comprising, in addition to the mobile, at least two stationary transmitter bases, each transmitter base being configured to transmit radio frequency signals, ($S1_A$, $S1_B$, $s_{dA}$, $s_{dB}$, $s_{rA}$, $s_{rB}$), the transmitter bases being synchronized to each other to transmit their respective signals, the mobile receiver being configured to receive and process said radio frequency signals ($s_{dA}$, $s_{dB}$, $s_{rA}$, $s_{rB}$) and to deduce therefrom its position by calculating the time-of-flight difference between the mobile receiver and the transmitter bases, the mobile receiver comprising means for storing position data of the stationary transmitter bases, characterized in that each transmitter base is configured to transmit a sum ($S1_A$, $S1_B$) of at least two unmodulated pure carrier signals of different frequencies, each pure carrier signal being in the form of an unmodulated continuous wave, preferably sinusoidal;

and in that the mobile receiver further comprises:

means for measuring, for each given signal frequency and for each respective transmitter base, the phase of the signal consisting of the various signals ($s_{dA}$, $s_{dB}$, $s_{rA}$, $s_{rB}$) coming from said base and having said frequency; and computing means connected to the measuring means and to the storage means, and configured to:

apply, for each transmitter base, a Fourier transform to a signal consisting of the various measured phases of the radio frequency signals coming from said base;

determine, for each transmitter base, from the Fourier transform computed for said base, a time-of-flight between the mobile receiver and said base;

calculate at least one time-of-flight difference between the mobile and two transmitter bases, said difference being calculated as the difference between the determined times-of-flight for said bases;

determine the position of the mobile receiver, from the calculated time-of-flight difference(s) and position data of the transmitter bases.

2. The system according to claim 1, characterized in that, for each transmitter base, the frequency difference between the minimum frequency and the maximum frequency of the pure carrier signals transmitted by said base is greater than 50 MHz.

3. The system according to claim 1, characterized in that each pure carrier signal transmitted by a transmitter base has a frequency located in the band of very high frequencies, in other words has a frequency in the range from 30 MHz to 300 MHz.

4. The system according to claim 1, characterized in that the stationary transmitter bases are configured to transmit the same number of unmodulated pure carrier signals.

5. The system according to claim 4, characterized in that the stationary transmitter bases are configured so as to transmit their sums ($S1_A$, $S1_B$) of unmodulated pure carrier signals in a frequency-shifted manner, with a predetermined frequency shift between two successive transmitter bases.

6. The system according to claim 5, characterized in that the frequency shift is in the range from 100 Hz to 1 kHz.

7. The system according to claim 1, characterized in that the stationary transmitter bases are antennas, preferably antennas distributed such that the distance between two adjacent antennas is greater than or equal to 5 kms.

8. The system according to claim 1, characterized in that the mobile receiver is a chip or an electronic card or else a mobile communication device such as a cell phone.

9. The system according to claim 1, characterized in that each stationary transmitter base is configured to synchronize between them the unmodulated pure carrier signals transmitted by the base.

10. The system according to any claim 1, characterized in that each stationary transmitter base is configured to transmit a sum S1 of N distinct unmodulated sinusoidal frequency signals $\omega_k$ distinct, said sum S1 satisfying the following equation:

$$S1 = \sum_{k=1}^{N} \cos(\omega_k t). \quad \text{[Math 6]}$$

11. A method for positioning at least one mobile receiver, implemented by a positioning system comprising, in addition to the mobile, at least two stationary transmitter bases, each transmitter base being configured to transmit radio frequency signals ($S1_A$, $S1_B$, $s_{dA}$, $s_{dB}$, $s_{rA}$, $s_{rB}$), the transmitter bases being synchronized to each other to transmit their respective signals, the mobile receiver comprising means for measuring signal phases, data storage means, and computing means connected to the measuring means and to the storage means, the method comprising an initial step of transmitting position data from the stationary transmitter bases to the storage means of the mobile receiver, characterized in that it further comprises the following steps:

an emission, by each of the transmitter bases, of a sum ($S1_A$, $S1_B$) of at least two unmodulated pure carrier signals of different frequencies, each pure carrier signal being in the form of an unmodulated continuous wave, preferably sinusoidal;

reception, by the mobile receiver, of the radio frequency signals ($s_{dA}$, $s_{dB}$, $s_{rA}$, $s_{rB}$) coming from the transmitter bases;

a measurement, by the mobile receiver, for each given signal frequency and for each respective transmitter base, of the phase of the signal consisting of the various signals ($s_{dA}$, $s_{dB}$, $s_{rA}$, $s_{rB}$) coming from said base and having said frequency;

an application, by the mobile receiver and for each transmitter base, of a Fourier transform to a signal consisting of the different measured phases of the radio frequency signals received from said base;

a determination, by the mobile receiver and for each transmitter base, from the Fourier transform computed for said base, of a time-of-flight (TV1A, TV1B) between the mobile receiver and said base;

calculating, by the mobile receiver, at least one time-of-flight difference ($TV_{diff}$) between the mobile and two transmitter bases, said difference ($TV_{diff}$) being calculated as the difference between the determined times-of-flight (TV1A, TV1B) for said bases (4A, 4B);

a determination, by the mobile receiver, of its position from the calculated time-of-flight difference(s) ($TV_{diff}$) and from the position data of the transmitter bases.

12. The method according to claim 11, characterized in that, during the step (18) of applying a Fourier transform, the Fourier transform is a discrete Fourier transform.

13. The method according to claim 11, characterized in that, during the step of applying a Fourier transform, the computing means of the mobile receiver use the time-of-flight as an independent variable for the applied Fourier transform.

* * * * *